United States Patent [19]

Keller et al.

[11] Patent Number: 4,922,838

[45] Date of Patent: May 8, 1990

[54] THERMAL PROCESSOR FOR SOLID AND FLUID WASTE MATERIALS

[75] Inventors: Michael R. Keller; Richard J. Holman, both of Tulsa, Okla.

[73] Assignee: John Zink Company, Tulsa, Okla.

[21] Appl. No.: 255,511

[22] Filed: Oct. 11, 1988

[51] Int. Cl.$^5$ ............................................... F23B 7/00
[52] U.S. Cl. .................................. 110/234; 110/212; 110/214; 110/235; 110/297
[58] Field of Search ............... 110/233, 234, 235, 213, 110/214, 297; 122/2

[56] References Cited

U.S. PATENT DOCUMENTS

| | | | |
|---|---|---|---|
| 3,446,163 | 5/1969 | Sharpe | 110/235 |
| 3,651,771 | 3/1972 | Eberle | 110/213 |
| 4,177,740 | 12/1979 | Lamb et al. | 110/213 |
| 4,419,942 | 12/1983 | Johnson | 110/234 |
| 4,476,791 | 10/1984 | Cegielski | 110/346 |
| 4,509,435 | 4/1985 | Adams | 110/213 |
| 4,516,510 | 5/1985 | Basic, Sr. | 110/214 |
| 4,531,462 | 7/1985 | Payne | 110/214 |

Primary Examiner—Edward G. Favors
Assistant Examiner—Denise L. Ferensic
Attorney, Agent, or Firm—Head & Johnson

[57] ABSTRACT

A primary combustor of waste solids, wherein the solids are burned under sub-stoichiometric air control and then substantially immediately merged with the burning zone in a secondary combustor wherein waste fluids are burned with excess air and substantial waste heat recovered in the form of an energy resource such as steam.

7 Claims, 7 Drawing Sheets

THERMAL PROCESSOR FOR SOLID AND FLUID WASTE MATERIALS

BACKGROUND

There is an increasing awareness and concern over means to dispose of combustible solid and/or fluid (liquid or gas) waste material, especially hazardous waste materials. "Hazardous waste" means any waste or combination of wastes which pose a substantial present or potential hazard to human health or living organisms because such wastes are ordinarily non-degradable of persistent in nature or because they can be biologically magnified, or because they can be lethal, or because they may otherwise cause or tend cause detrimental cumulative effects. Industrial processors and manufactures have greater awareness of the problems of safe disposal of their generated waste material.

Extensive government regulations have been enacted to control the situation and to insure disposal of such waste materials in an environmentally acceptable manner. Such regulations require the proper combustion or burning of combustible solid and/or fluid waste materials along with requirements as to the useful recovery of energy resources e.g., steam, heated liquids or gases as an added benefit. One example of a hazardous waste fluid steam generator is described in U.S. Pat. No. 4,476,791 which is incorporated herein by reference. The teachings of that patent are directed to the combustion and useful recovery of heat from hazardous waste fluids. An example of a combustor for the burning of solid materials is found in U.S. Pat. No. 3,651,771.

SUMMARY

It is a primary object of this invention to provide an integrally designed thermal processor i.e., combustor, boiler or furnace unit, for the disposal of solid and/or fluid waste materials, including hazardous waste materials. In particular the apparatus for the invention is directed to apparatus and processes which have the physical provisions for recovering and exporting thermal energy in the form of steam, heated fluids, or heated gases. It is a further object of this invention to provide a thermal processor having dual combustion areas, one to handle fluid waste materials and the other to handle solid waste materials which then utilize common energy resource recovery sections all of which is physically consolidated into one manufactured or assembled unit, as opposed to separate units which are connected by duct work.

Another object of the invention is to provide an integral thermal processor for the combustion disposal of solid waste materials, e.g. plastics, in combination with a fluid (gas and/or liquid) fired boiler or furnace wherein the flow of combustion gases from the combustion of solid waste are directly integral with the combustion process and/or products of combustion from the fluid fired boiler or furnace.

In particular in invention is directed overall to a boiler to integrally thermally process solid waste and fluid waste materials including but not limited to hazardous waste solids and fluids.

A vertically oriented primary combustor for burning solid waste is integrally connected to a secondary combustor or boiler such as shown in U.S. Pat. No. 4,476,791. A closable opening means is provided in the primary combustor housing to permit reception of the solid waste products thereinto. Typically this opening is contiguous with the top of the housing. An air/fuel burner is provided in the primary combustor above the bottom thereof to ignite and maintain burning of the solid waste materials. Once the solid has been ignited and is in a condition of stable burning, the air/fuel burner can be shut off. An under-fire forced air manifold is provided around the bottom inner periphery of the incinerator as a means to maintain combustion. The gaseous products of the combustion are then caused to directly flow into the secondary combustors burning section to be co-mingled with the products of combustion of the secondary burning. Preferably the amount of under-fire air is sub-stoichiometric with the additional air to complete combustion being supplied in the secondary combustor.

The secondary combustor includes a fluid burner section producing products of combustion which are then cooled by radiant heating of a fluid in heat exchange tubing, followed by the passage of the products of combustion for further cooling in a convection heat transfer section. The design of the unit is such that the temperature of the combustion products is maintained for sufficient residence time to convert any hazardous or harmful gaseous constituents into non-hazardous or environmentally safe products of combustion for exhaust to the atmosphere. The convection heating section includes heat exchange tubing to recover an energy resource in the form of steam or other heated fluids for useful purposes, as for example the needs of the plant or process from which the waste materials eminate.

A further aspect of the invention is a novel combustor system for solid waste materials that can be readily combined, i.e., attached or made integral with an existing boiler for use in facilities where disposal of solid waste materials is demanded or desired.

DETAILED DESCRIPTION OF THE PREFERRED EMBODIMENT

Before explaining the present invention in detail, it is to be understood that the invention is not limited to its application to the details of construction and arrangement of parts illustrated in the accompanying drawings, since the invention is capable of other embodiments and of being practiced or carried out in various ways commensurate with the claims herein. Also it is to be understood that the phraseology or terminology employed herein is for the purpose of description and not of limitation.

Figure 1:
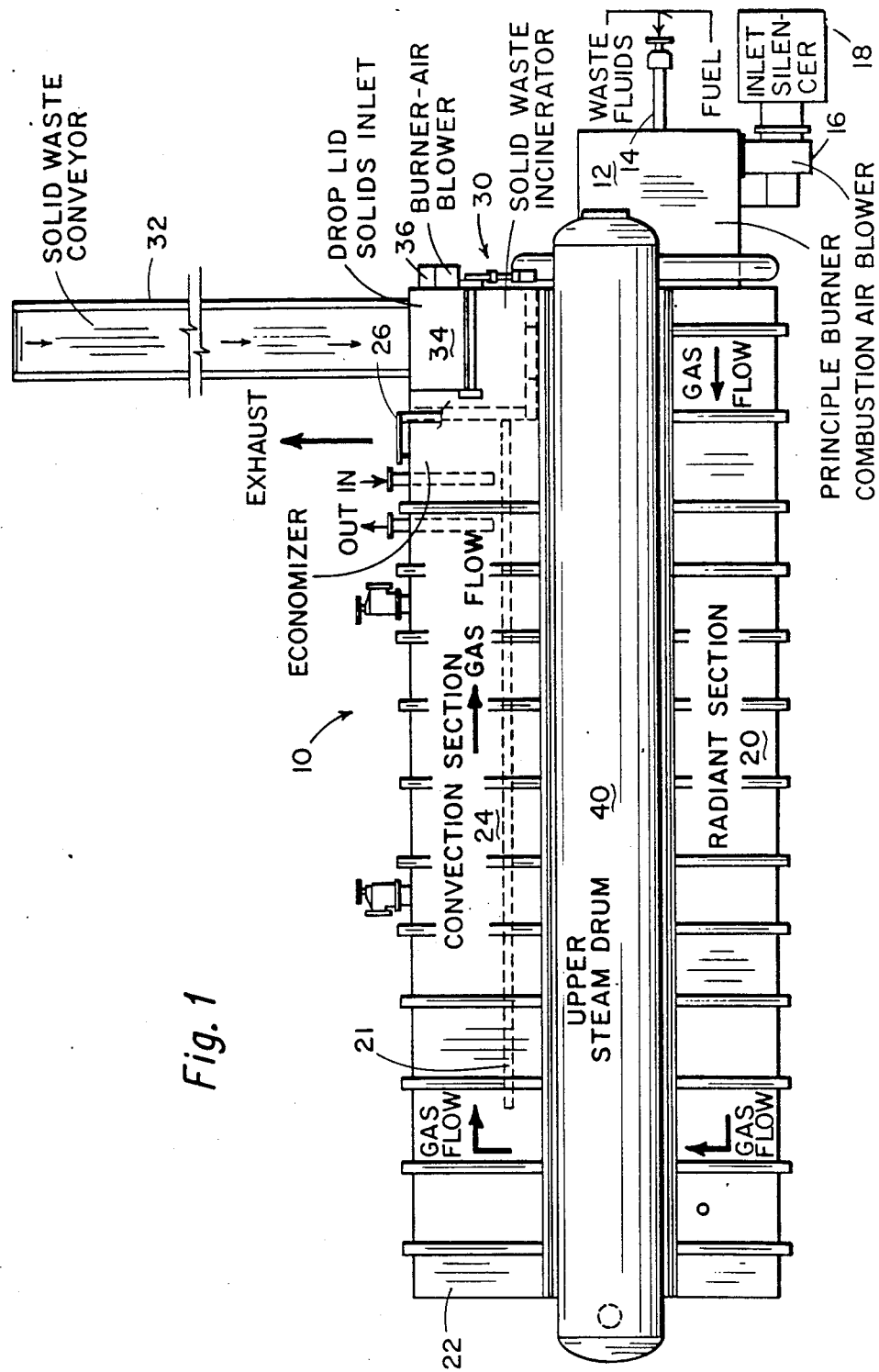
FIG. 1 is an overall top elevational view of the apparatus of this invention.
Figure 2:
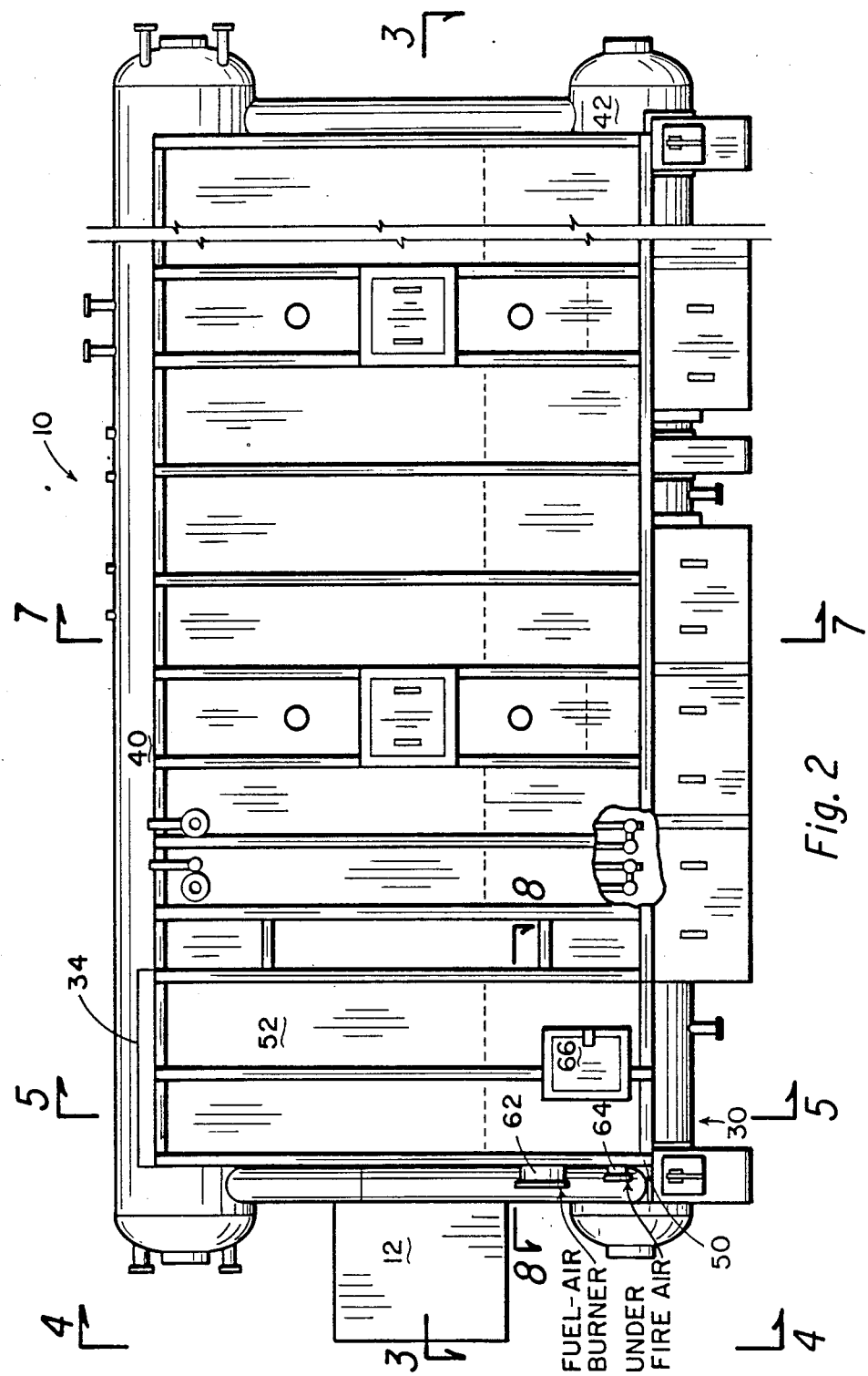
FIG. 2 is a right side-elevational view of the boiler incorporating the principles of this invention.
Figure 3:
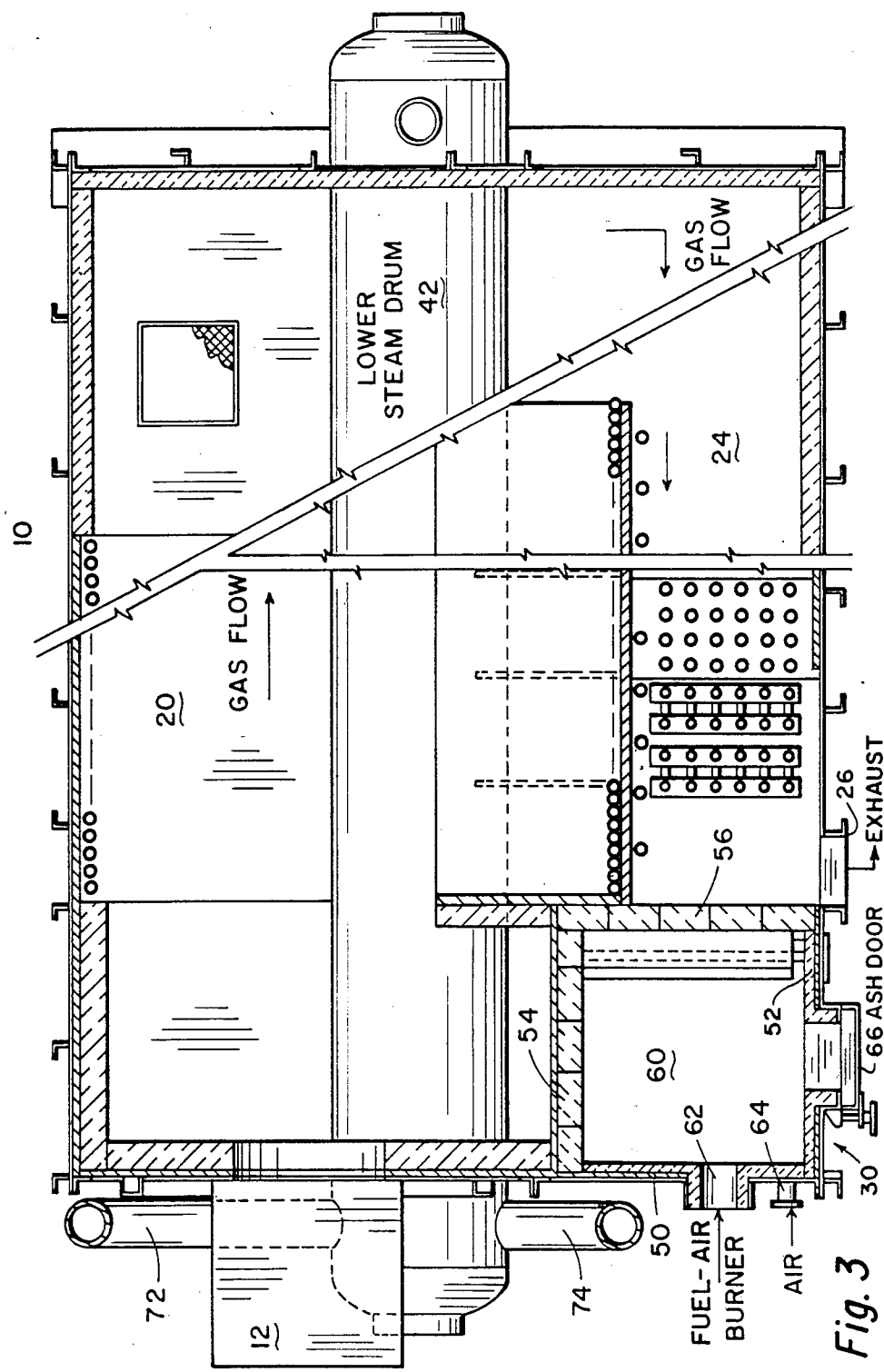
FIG. 3 is a horizontal sectional view taken along the line 2—2 of FIG. 2.

FIG. 1 is an overall general view of the boiler or thermal processor apparatus of this invention which has capabilities of burning combustible waste solid materials in a primary combustor 30 which permits the products of combustion therefrom to be integrally and immediately directed into a secondary combustor 12 where combustible waste fluids and/or fuel are burned. The overall apparatus is generally identified by the numeral 10. The secondary combustion burner 12 includes means for receiving and burning fuel and/or waste fluids (gases, liquids or slurries) via an inlet burner tube 14. Combustion air is supplied by a blower 16 having a silencer 18. The flow of gases from the secondary burner is shown by the arrows which pass first through a radiant section 20 followed by a 180° turn of the gases at the end 22 followed by flow through the convection section 24 which may include one or more economizer sections, thence to the exhaust means 26. Heated and/or superheated steam for use elsewhere is removed from the boiler in a manner well-known to those skilled in the art.

The solid waste primary combustor, generally identified by the numeral 30, is positioned at one corner of the boiler having sides (two shown) in communication with the thermal walls of the secondary combustor particularly the wall adjacent the burning zone in the secondary combustor. A conveyor 32 is shown for the transport of solid waste materials which charge the primary solid waste combustor through a closable door 34. A combustion air blower system 36 is positioned along one side of the primary solid waste combustor. The secondary combustor heat recovery systems may include an upper steam drum 40 and a lower steam drum 42, best shown in the other views.

The operation of the secondary combustor system is pursuant to that described in U.S. Pat. No. 4,476,791, or in a similar conventional manner wherein fuel and/or combustible waste fluids are introduced through a burner conduit 14 into the burner/air mixing zone 12 for combustion at the inlet to the radiant section 20. Excess combustion supporting air is provided by blower means 16. The combustion process and the products of combustion therefrom are caused to burn within the radiant section 20 being diverted by the end wall of the boiler 22 into the convection section which is essentially divided by a wall 21 with the resulting cooled gases flowing in the direction shown to an exhaust or outlet 26. From there the gases may be further treated by passage through appropriate and subsequent venting to the atmosphere in an environmentally acceptable condition.

The primary solid waste combustor, generally designated by the numeral 30, is best described with reference to the various figures herein and in particular FIGS. 3, 5, 6, and 8–10. The combustor, in this embodiment, is refractory lined and encompasses an essentially vertical housing having a front wall 50 a right side wall 52, a left side wall 54 and a back wall 56. At the top of the combustor is an inlet door or hopper 34 with provision to receive solid waste material which enters and drops into the interior of the combustor to the floor 60 of the lower combustion area. A variety of waste loader devices can be employed, including batch or continuous and/or automatic charge systems, or a ram type loader. Above the refractory lined bottom 60 is a fuel air burner 62 and a forced under-fire air inlet 64 adjacent the bottom 60 of the combustor and hereinafter described in greater detail. An ash door 66 is provided for the removal of the solid products of combustion that may accumulate therein from time to time.

Figure 4:
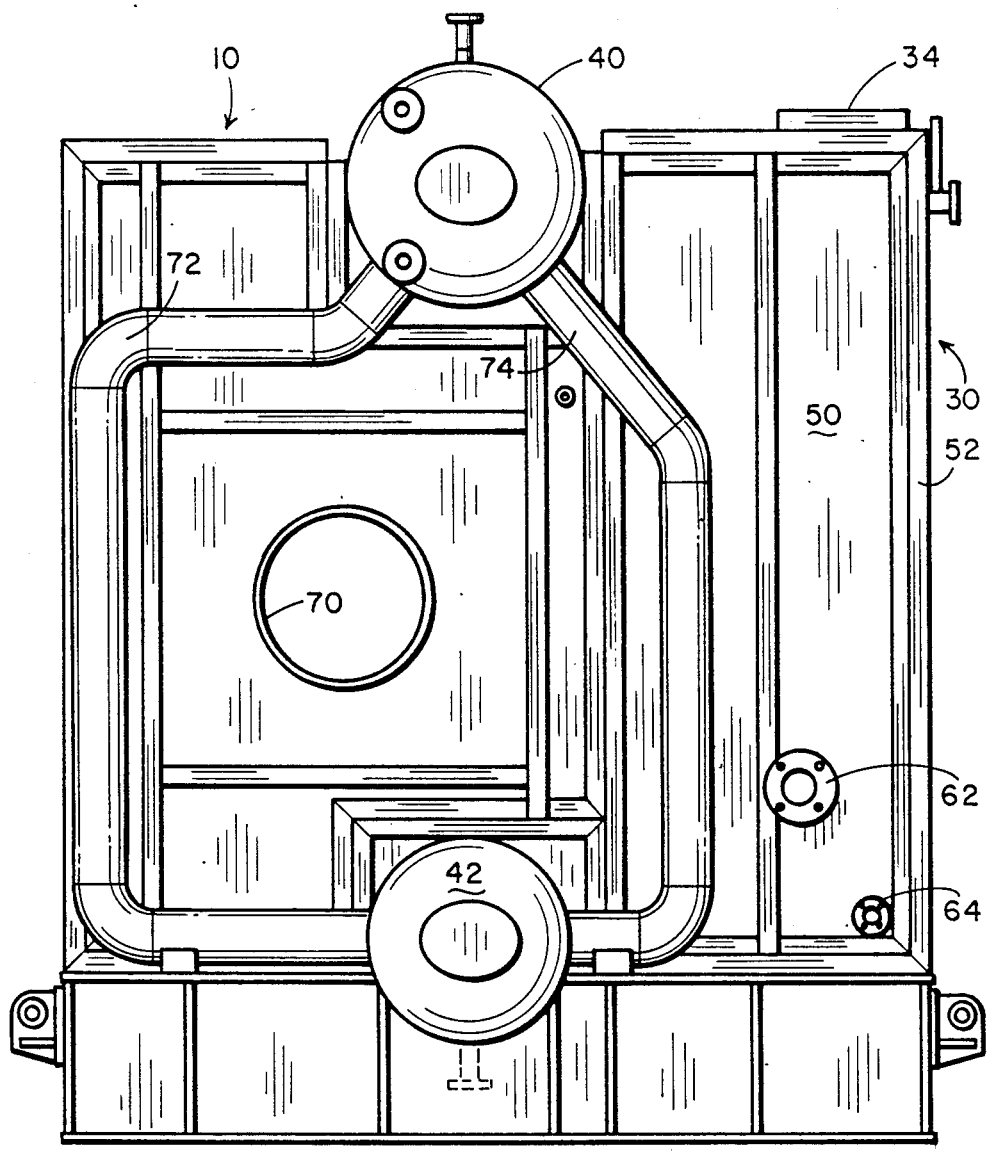
FIG. 4 is a front elevational view of the boiler taken the line 4—4 of FIG. 2.

FIG. 4 is a frontal view depicting the invention, with the secondary combustor 12 being removed, showing the openingn 70 therefore, through which the products of combustion enter the radiant section of the boiler 10. In this view downcomer pipes 72 and 74 connect with the respective upper and lower steam drums 40 and 42.

Figure 5:
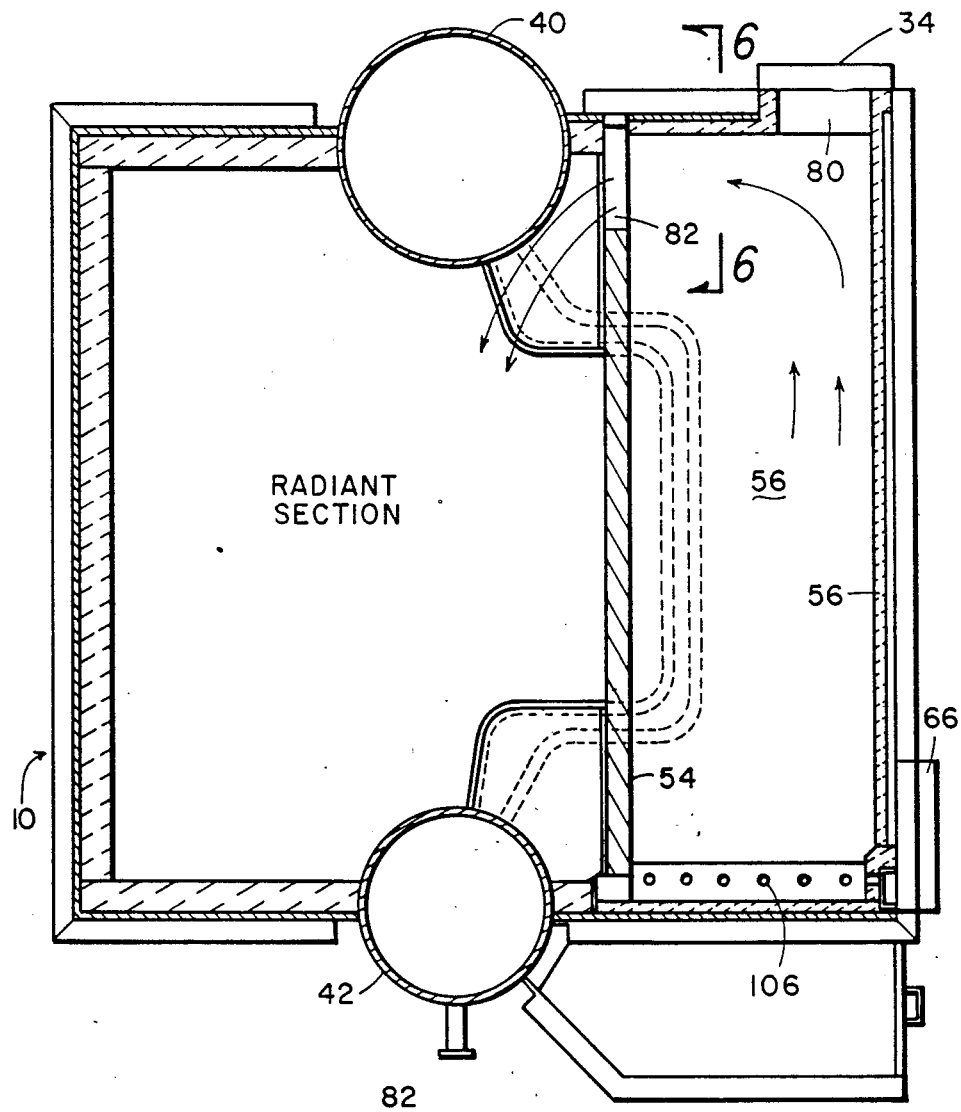
FIG. 5 is a sectional view taken along the line 5—5 of FIG. 2.
Figure 6:
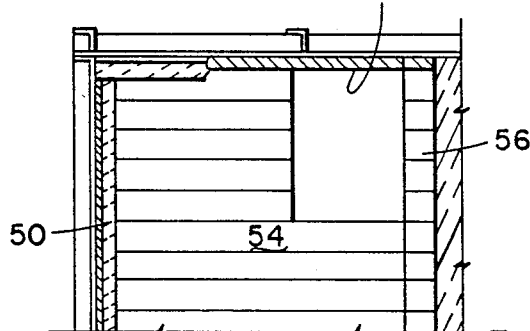
FIG. 6 is a partial sectional view of the solid waste incinerator taken along the line 6—6 of FIG. 5.
Figure 7:
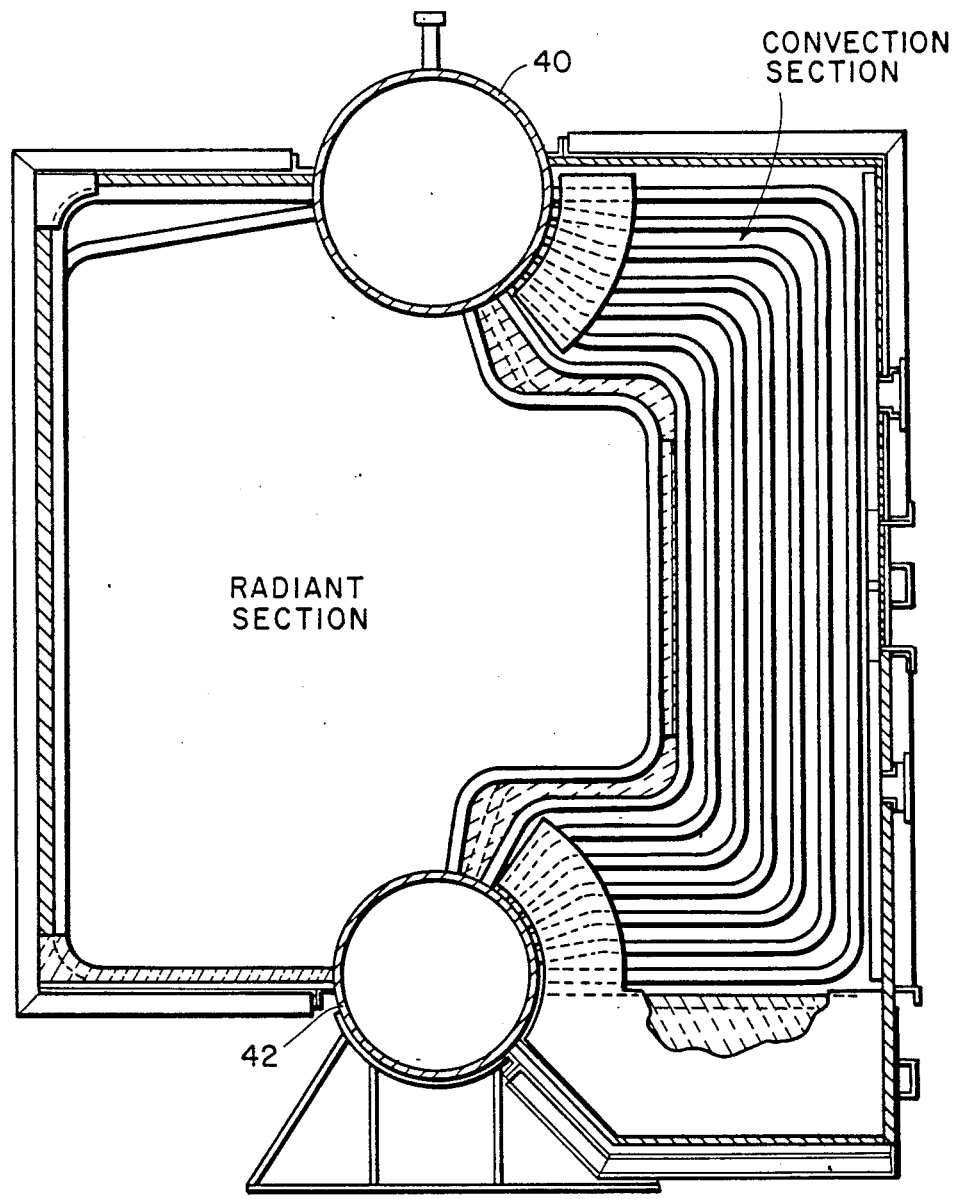
FIG. 7 is a sectional view taken along the line 7—7 of FIG. 2.
Figure 8:
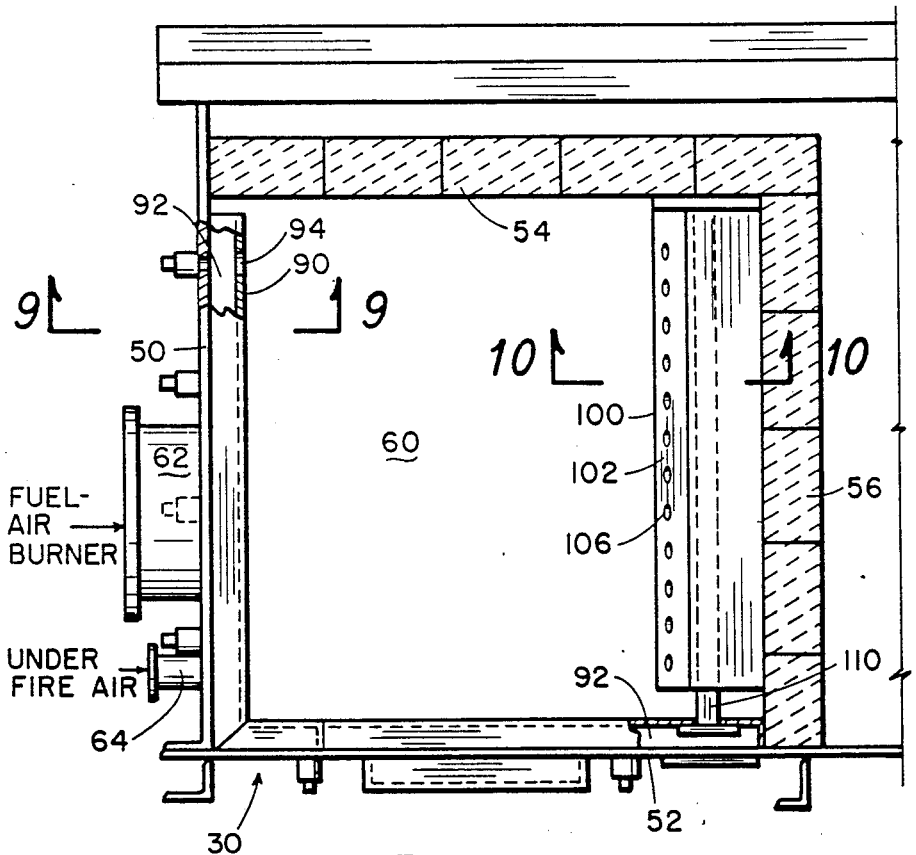
FIG. 8 is a sectional view of the incinerator taken along the line 8—8 of FIG. 2.
Figure 9:
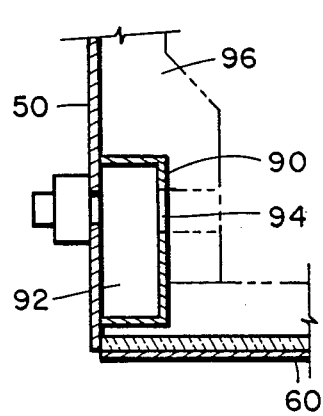
FIG. 9 is a sectional view taken along the line of 9—9 of FIG. 8.
Figure 10:
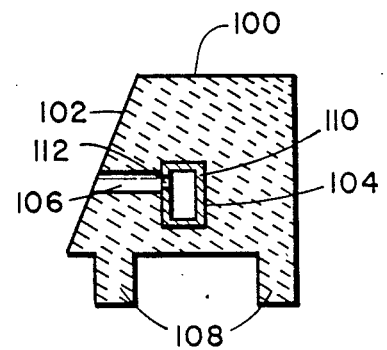
FIG. 10 is a section view taken along the line 10—10 of FIG. 8.

Referring now to FIG. 5, another view of the solid waste primary combustor is shown in cross section looking from the front. Door 34 is shown closing the solid waste inlet opening 80. The door may be opened automatically in any well-known manner by either a sliding motion or hinged motion. In FIG. 5, the direction of the resulting combustion gases from the primary combustor are shown as they pass directly into the secondary combustor burning area through opening 82 without passage through duct-work. The size of opening may vary in accordance with the size of the solid waste primary combustor and/or in the volume of burning gases. Means may be provided to insure that there is ia sufficient pressure differential to cause the flow of the combustion gases from the solid waste primary combustor into the secondary combustor burning area.

Of particular importance to this invention is the construction of the lower combustion area of the solid waste primary combustor. As shown in the figures, and in particular FIGS. 8, 9, and 10, the fuel air burner inlet 62 is positioned above the bottom 60 of the combustor to provide the primary means foro igniting and maintaining the combustion of the materials therein. Once the ignition of the solids is established the fuel air burner is shut off and combustion is then maintained by an under-fire forced air system entering at conduit 64 into a manifold formed by a channel 90 which, in this embodiment, extends along the two exposed sides 50 and 52 of the solid waste primary combustor. The manifold space is indicated by the numeral 92. Positioned along the manifold are a plurality of spaced openings 94 for the injection of air therethrough into the burning combustible solids. Suitable refractory 96, formed as a part of the front and side walls, protects the manifold from the heat of combustion. A destructor hearth 100 is provided along at least one of the side walls, in this instance 56, and is formed of a refractory or heat resistant material. The hearth includes a sloping front face 102 and a preformed opening 104 along its longitudinal length. A plurality of spaced horizontal openings 106 are provided along the sloping face 102. Feet 108 are provided at the bottom to keep the hearth above floor 60. A length of squared tubing 110 is adatped to be inserted into the opening 104, the tubing including a plurality of openings 112 which coincide with each respective spaced opening 106. The conduit 110 is in communication with the manifold 92 to receive air therefrom.

In operation, once solid waste material has entered the primary combustor, the primary fuel air burner 62 is initially used to ignite the waste materials charged therein. It can also be used for initial warm up of the refractory and to help keep the temperature in the chamber at a design set point when insufficient heat is generated from the burning of the solid waste. The burner is cycled on or off, or modulated based on an auxiliary set point switch or device formed as a part of a primary temperature controller to insure continuous burning of the waste material in the primary combustor.

The volume of inder-fire combustion air supplied through conduit 64 to manifold space 92, the outlets therefrom and the destructor hearth 100, is controlled by monitoring the flue gas temperature leaving the incinerator so that the air supply is insufficient i.e., substoichiometric, for complete combustion of the waste material. The combustion air necessary for stoichiometrically completing the combustion of the waste gases is then supplied by the secondary combustor. The underfire air enters the chamber through the evenly distributed ports 94 and 106. The rate of burning can be controlled by adjusting manual air dampers, not shown. Excessive under fire air creates excessive temperatures and rapid burndown, creating turbulence that causes undesirable particulate entrainment in the products of combustion. On the other hand, too little air will cause incomplete volatilization of the solid waste material and unburned hydrocarbons in the ash. Control means are provided for automatically shutting off the burner whenever the loading door 34 is open. The automatic functions then will resume when the door is closed. The burner within the solid waste incinerator will also automatically shut down and be prevented from restarting if the temperatures or other conditions exceed given set points.

The purpose of the system herein is to reduce the volume of waste materials with a minimum of auxiliary fuels while producing environmentally acceptable stack emissions and ash characteristics.

The solid waste primary combustor stage partially oxidizes the solid waste material as it burns, driving off the volatile gases. This is accomplished by the hearth and well distributed, low velocity, substoichiometric combustion air source to minimize entrainment of particles. The passage of the products of combustion therefrom pass directly into the secondary burning stage where off gases and unburned particles are completely oxidized. Control of sufficient residence time and temperature within the radiant to convection section helps in achieving complete combustion with resulting environmentally acceptable stack emissions and useful energy resources.

What is claimed:

1. In an integral apparatus to thermally process hazardous waste fluids and/or solid wastes said apparatus having a secondary combustor comprising a fluid burner section producing products of combustion which are passed first to a radiant heat section with heat exchange tubing therein to receive said products of combustion and heat a fluid in said heat exchange tubing thence cause said products of combustion to pass to a convection heating section with heat exchange tubing therein to heat fluid in said tubing, the improvement comprising a vertically oriented primary combustor for burning solid wastes which is integrally connected with said secondary combustor and its fluid burner section, said primary combustor comprising:

closable means to load said solid waste material into said primary combustor;
   a primary air/fuel burner in an outside wall positioned above the bottom of said primary combustor to ignite and maintain burning of said solid waste material;
   an under-fire forced air manifold around the inner bottom periphery of at least one side of said incinerator; and
   said primary combustor having an opening contiguous its top for direct passage of products of combustion from said primary combustor into said fluid burner section of said secondary combustor.

2. A thermal processor comprising:
   a substantially enclosed combustible solid waste primary combustor, said primary combustor being rectangular in cross-section with vertical walls;
   means adjacent the top of said primary combustor to receive said solid waste into said primary combustor;
   means adjacent the bottom of said primary combustor to ignite and initiate burning of said solid waste;
   means adjacent the bottom of said primary combustor to inject underfire air into said burning solid waste in an amount that is less than the stoichiometric requirements for complete combustion of said solid waste creating products of combustion;
   a secondary combustor of the type having a fuel/air burner to create a secondary burning zone having excess air, with means to exchange heat of the combustion products therefrom to create recoverable energy resources in the form of heated fluids;
   said primary combustor integrally connected to said secondary combustor such that two of said vertical walls are common to both said primary and secondary combustors;
   means adjacent a top of one of said vertical walls to substantially immediately merge said products of combustion from said primary combustor into said secondary burning zone; and
   means to provide excess air in said secondary burning zone to provide at least the stoichiometric requirement to complete the combustion of the products of combustion from said primary combustor.

3. A thermal processor comprising:
   a substantially enclosed combustible solid waste primary combustor;
   means to receive said solid waste into said primary combustor;
   means above the bottom of said primary combustor to ignite and initiate burning of said solid waste;
   means comprising a destructor hearth horizontally positioned at the bottom of said primary combustor to inject underfire air into said burning solid waste in an amount that is less than the stoichiometric requirements for complete combustion of said solid waste creating products of combustion, said destructor hearth being a parallelepiped constructed of refractory material having a sloping face toward said burning solid waste, a longitudinal air conduit in said hearth and a plurality of spaced horizontal openings in communication with said conduit between said sloping face and said conduit;
   a secondary combustor of the type having a fuel/air burner to create a secondary burning zone having excess air, with means to exchange heat of the combustion products therefrom to create recoverable energy resources in the form of heated fluids;
   means to substantially immediately merge said products of combustion in said primary combustor into said secondary burning zone; and
   means to provide excess air in said secondary burning zone to provide at least the stoichiometric requirement to complete the combustion of the products of combustion from said primary combustor.

4. The thermal processor of claim 3 including a refractory covered horizontal under-fire air supply manifold in at least one wall of said incinerator, said manifold in communication with said longitudinal conduit of said destructor hearth.

5. The thermal processor of claim 3 wherein said primary combustor and said secondary combustor are integrally connected with a communications opening whereby said products of combustion from said primary combustor are substantially immediately merged with said secondary burning zone.

6. The thermal process of claim 3 wherein at least one wall of said secondary combustor is integrally conected to form one wall of said primary combustor.

7. The thermal processor of claim 6 wherein an opening is provided in at least one wall to the passage of said products of combustion from said primary combustor into said burning zone.

* * * * *